April 16, 1968     J. D. WRIGHT ET AL     3,377,804
FLOW MIXERS PARTICULARLY FOR GAS TURBINE ENGINES
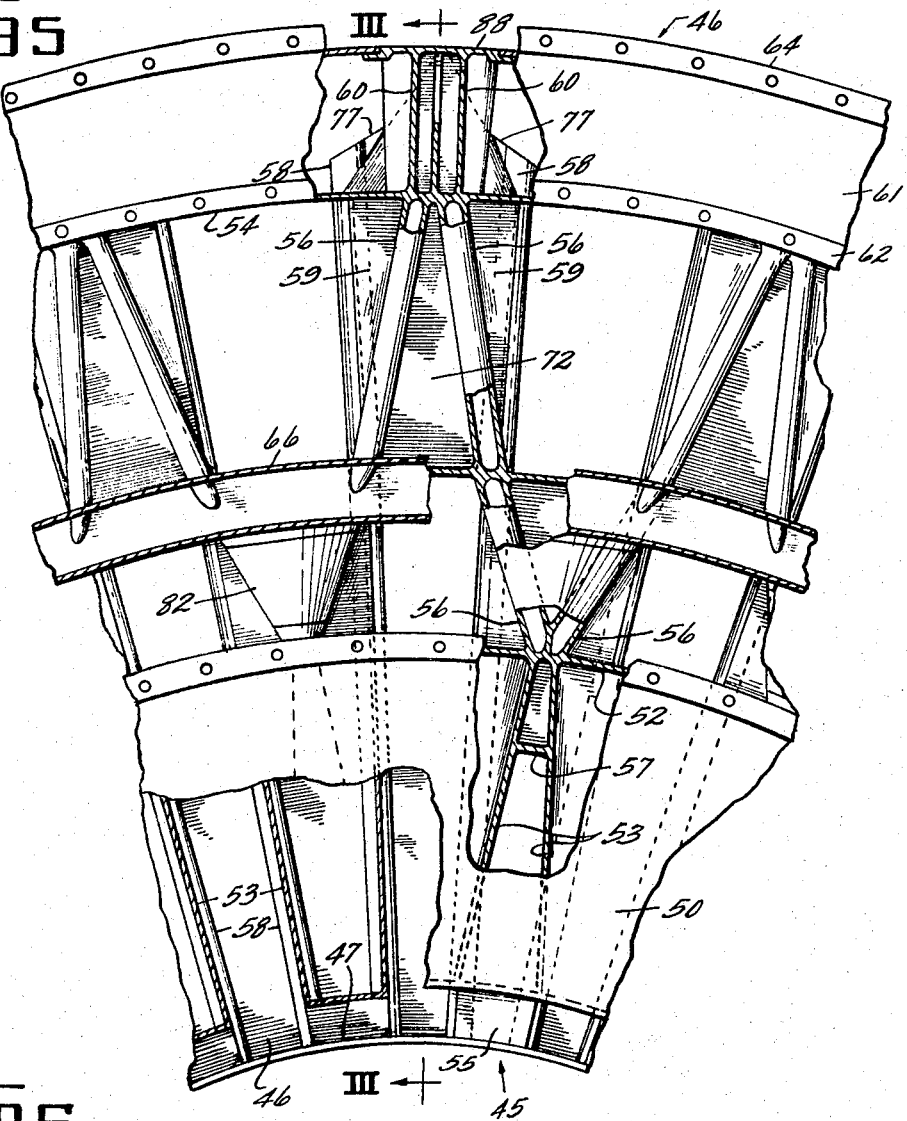
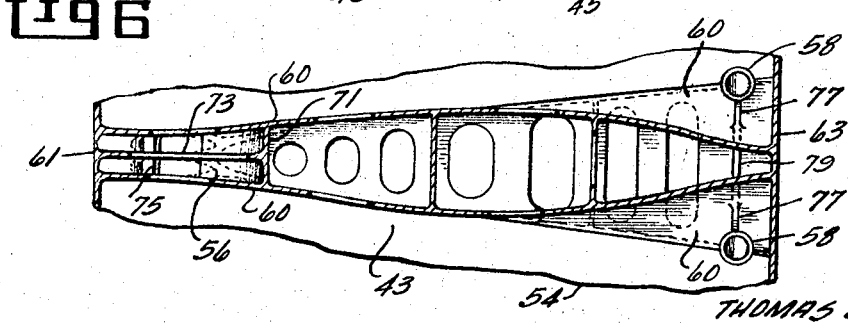
INVENTORS
THOMAS L. HAMPTON
JACK D. WRIGHT

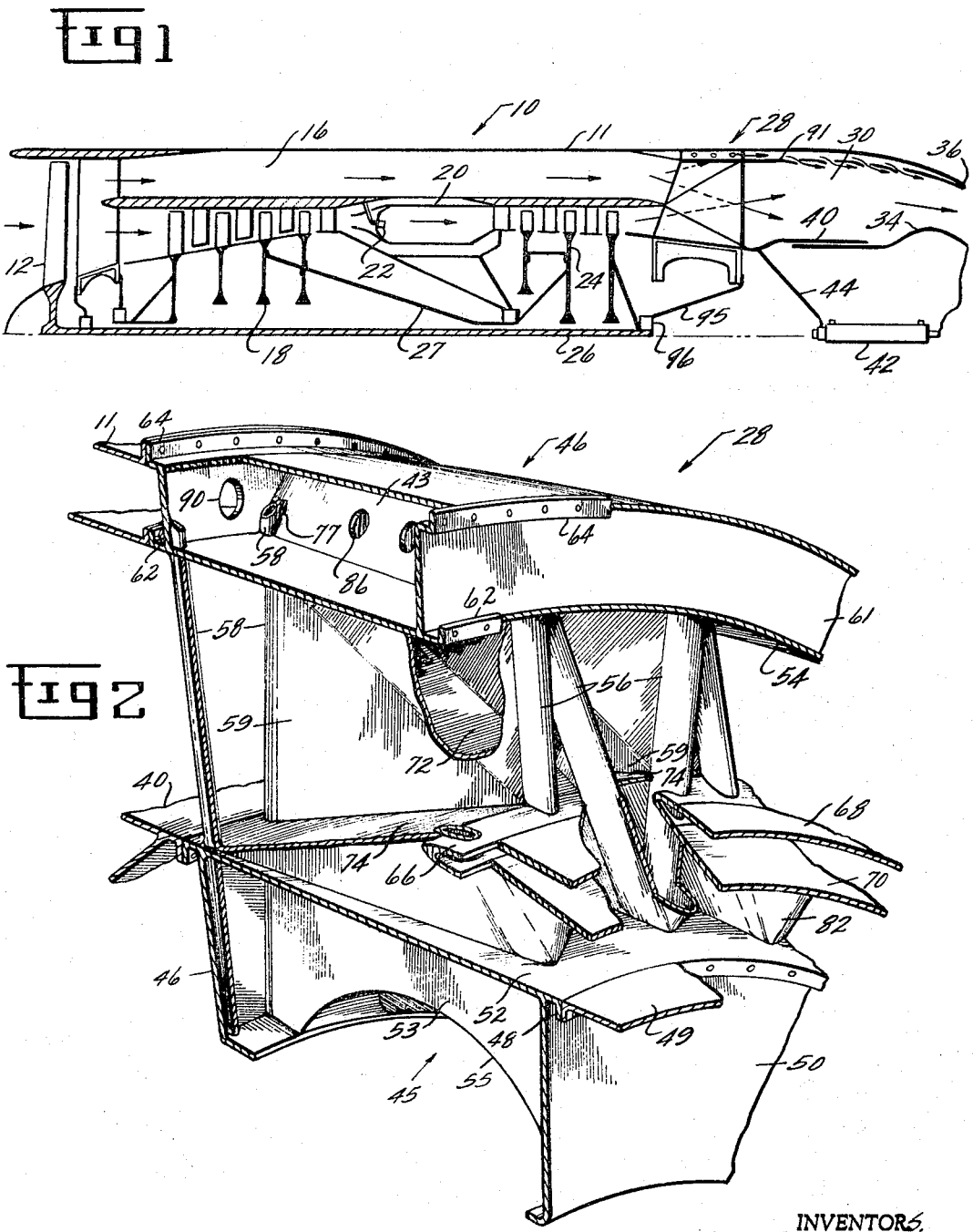

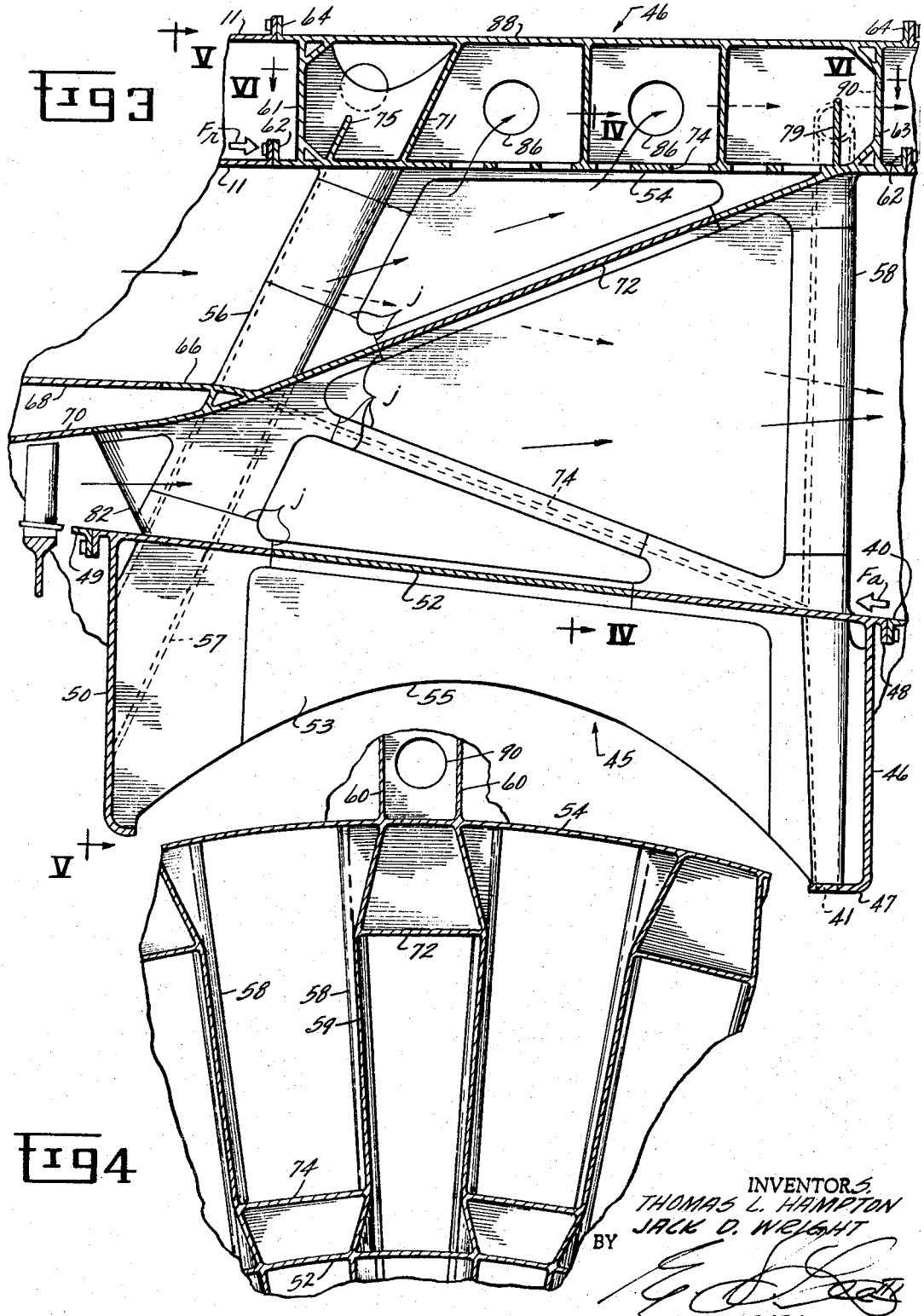

3,377,804
FLOW MIXERS PARTICULARLY FOR GAS TURBINE ENGINES

Jack D. Wright, Mason, and Thomas L. Hampton, Cincinnati, Ohio, assignors to General Electric Company, a corporation of New York
Filed June 13, 1966, Ser. No. 556,968
9 Claims. (Cl. 60—262)

The present invention relates to flow mixers for mixing concentric fluid streams and the use of such mixers in a gas turbine engine.

In the quest for greater efficiency and performance in aircraft propulsion, it is common practice to utilize a gas turbine engine of the bypass type. In engines of this type a core engine, or main gas generator, is surrounded by a concentric annular bypass duct which discharges relatively cool air into the same chamber which receives the hot gases from the main gas generator. In order to thoroughly mix the concentric fluid streams from the bypass duct and the main gas generator, they are directed through a flow mixer before being discharged through an exhaust nozzle.

Generally the exhaust nozzle is provided with means to vary its area for optimum thrust. One of the more efficient ways of varying the exhaust nozzle area is to provide a plug which is axially translatable towards the nozzle.

While providing an extremely efficient means for varying exhaust nozzle area, the plug is subjected to extremely high loads which necessitate a very rigid mounting member for the plug.

The mounts for these plugs have been very massive structures in order to transmit the applied loads over a distributed area to a thin-walled engine casing which forms a common mount for the various engine components.

In such an arrangement, the mounts for the plug must be axially displaced from the flow mixer, as hitherto before mixers have been used as aerodynamic guides and incapable of supporting substantial loads. The use of the separate components adds considerable weight and length to an engine.

Accordingly, it is an object of the present invention to provide a flow mixer that functions as a lightweight, rigid mounting member and functions as a mixer for concentric fluid streams.

It is a further object to provide a lightweight flow mixer for use in a bypass type gas turbine engine that functions as a mount for a plug used in an exhaust nozzle while mixing concentric fluid streams of bypass air and main gas generator discharge gases.

The above ends are achieved by providing a flow mixer for mixing inner and outer concentric fluid streams bounded by an outer, generally cylindrical, thin-walled casing and separated by an intermediate annular duct. The flow mixer comprises inner and outer annular structural members having ducts defining the inner and outer bounds of said fluid stream. The annular structural members further comprise relatively thin rings extending from both ends of the ducts and longitudinal stiffeners interconnecting the rings, thereby providing the annular structural members with a maximum strength to weight ratio in resisting a doughnut moment applied thereto. A plurality of struts are provided for structurally interconnecting the inner and outer annular structural members at the inlet and outlet ends of the flow mixer. Generally longitudinal panel means interconnecting the inlet and outlet struts are provided for longitudinal stiffening thereof and for providing separate flow passages through the mixer. Ramps extending from the intermediate duct to the outer duct are provided through certain passages for discharge of the inner fluid stream from the flow mixer and other ramps extending from the intermediate duct to the inner duct are provided through other passages for discharge of the outer fluid stream from the flow mixer. The fluid streams thereby are discharged across the full width of the flow mixer outlet annulus and the fluid streams are interspersed around the circumference of the outlet annulus. The inner annular member is adapted to receive generally axial loads and the outer annular member is adapted to mount on the cylindrical casing whereby the deflection of the flow mixer in response to the loads on the inner casing is minimized and the loads are transmitted to the cylindrical casing in substantially an axial direction.

Preferably, the flow mixer is provided with flanges extending from the inner and outer ducts, and the flow mixer is in combination with a gas turbine engine of the bypass type, wherein the outer casing and the intermediate duct provide a flow path for bypass air and the intermediate duct defines the outer bounds of a flow path for a hot gas stream discharged from the main gas generator of the engine. The flow mixer is secured to the casing immediately adjacent the discharge end of the main gas generator. The gas turbine engine comprises a mixing chamber secured to the outlet of the flow mixer and a generally cylindrical plug secured to the inner annular member of the flow mixer. The plug cooperates with the mixing chamber to form an exhaust nozzle whereby the flow mixer transmits the relatively large axial and bending loads exerted thereon by said plug to the casing in substantially an axial direction and the deflection of the casing in response to radial loads on the inner member is minimized. The flow mixer therefore forms an integral structural unit with the casing thereby minimizing the axial length of the engine.

The above and other related objects and features of the invention will be apparent from a reading of the following description of the disclosure found in the accompanying drawing and the novelty thereof pointed out in the appended claims.

In the drawings:

FIGURE 1 is a longitudinal section of a gas turbine engine shown in simplified fashion and incorporating a flow mixer embodying the present invention;

FIGURE 2 is a fragmentary perspective view of the flow mixer shown in FIGURE 1;

FIGURE 3 is a longitudinal section of the flow mixer shown in FIGURE 1, taken on line III—III of FIGURE 5;

FIGURE 4 is a view taken on line IV—IV of FIGURE 3;

FIGURE 5 is a view taken on line V—V of FIGURE 3; and

FIGURE 6 is a view taken on line VI—VI of FIGURE 3.

FIGURE 1 shows, in simplified fashion, a gas turbine engine environment in which the present invention is embodied. The engine 10 comprises a relatively thin-walled, generally cylindrical, casing 11 and a low pressure compressor 12 which accepts air through an inlet 14 and pressurizes it for discharge to an annular bypass duct 16 and a high pressure compressor 18. The compressor 18 pressurizes the air for discharge into a combustor 20 where fuel is injected through a series of nozzles 22. The fuel-air mixture is ignited by well known means to generate a hot gas stream which passes through a turbine section 24. A portion of the energy available from the hot gas stream drives the turbine rotors which are connected to the compressors 12, 18 by means of suitable shafts 26, 27.

The concentric fluid streams from the bypass duct 16 and the turbine section 24 are mixed by means of a flow mixer 28 and discharged into a chamber 30. Fuel is injected into the chamber 30 and the resultant mixture of fuel, bypass air, and turbine discharge gases is ignited by suitable means to provide a gas stream having a very high energy level. This gas stream is then discharged through a nozzle 36 to provide a propulsive force.

The exhaust nozzle 36 has an effective area which is varied by an axially translatable plug 34. The plug 34 is telescoped into a cylindrical support member 40 and is translated by an actuator 42 suitably secured to the plug 34. The actuator is mounted on the cylindrical support member 40 by conical portion 44 thereof.

Although the plug nozzle arrangement thus described is significantly more efficient than other types of variable area nozzles in the optimization of engine performance, the plug 34 imposes severe loads on the support member 40. The primary forces exerted on the support member 40 are generated by the flow of the gases around the plug nozzle 34 and by translation of the plug 34 in the chamber 30. Additionally, the length and mass of the plug nozzle 34 causes static radial loads and a bending moment on the support member 40. When the engine 10 is propelling an aircraft which abruptly changes direction, the bending moment may reach a relatively high level.

In accordance with the present invention the structural flow mixer 28 is adapted to provide a rigid mounting for the plug support member 40, while mixing the concentric fluid streams.

Reference is now made to FIGURES 2–6 which show in detail the flow mixer 28. The flow mixer functions as a structural element and is compositely formed as an integral thin-walled annular member comprising as structural elements an inner, annular structural member 45 and an outer, annular structural member 46. The structural members 45 and 46 have ducts 52 and 54 which define the inner and outer bounds of the two fluid streams. The members 45 and 46 are structurally interconnected by hollow struts 56 and 58 extending therebetween at the inlet and outlet ends respectively. The struts 56 have a streamline cross section and are arranged in truss-like fashion with adjacent struts meeting alternately at the inner and outer members respectively. The struts 58 have a generally tubular cross section and are disposed radially of the engine axis and aligned essentially with the midpoint of each angled strut 56, as shown in greater detail in FIGURE 6.

Each aligned pair of struts 56 and 58 are interconnected by panel means 59 to define, in part, flow paths through the mixer 28. As previously indicated, one function of the flow path through the mixer is to intermix the air flowing through the bypass duct 16 and the hot gas stream discharged from the turbine section 24. Thus it will be seen that walls 68 and 70 form an intermediate duct separating the bypass stream and the hot gas stream. These walls terminate at a faired member 66 intermediate the width of the struts 56. Additionally, a duct 49 which defines the inner bounds for the fluid stream discharged from the turbine section 24 is secured to the duct 52.

Ramp panels 74, between adjacent alternate struts 56, extend from this member 66 to the downstream end of the duct 52, thereby defining alternate, inwardly directed, diverging flow paths for the bypass air to diffuse into the chamber 30 as shown in FIGURE 4. Ramps 72 extend, between the remaining adjacent struts 56, from the trailing edge of the faired member 66 to the downstream end of the outer duct 54. Fairings 82 are connected to adjacent struts 56 within the turbine discharge flow path to define the entrances to outwardly directed divergent flow paths for the hot gas stream discharged from the turbine section 24. These flow paths are further defined by the duct 52, the underside of the ramps 72, and the panel means 59. Thus the hot gas stream and the air stream from the bypass duct 16 are simultaneously discharged through alternate passageways, the exits of which are defined by the struts 58 and the ducts 52, 54.

The struts 56 have a streamline cross section to minimize losses through the entrance to the flow mixer, and the struts 58, by virtue of their blunt trailing edges, induce a turbulence in the fluid streams discharged from the mixer 28 which promotes highly efficient mixing.

The outer portion of the struts 56 form inlets for a third set of passageways which are provided in the structural flow mixer 28 by the panel means 59 and the upper surfaces of the ramps 72. These passageways divert bypass air from the duct 16 outwardly through a series of openings 74 in the duct 54 into a plenum chamber 43 in the outer annular member 46 from which the air may be conducted for cooling purposes, as later described.

The structural flow mixer 28 provides significant advantages in mixing concentric fluid streams and utilizing one of the streams for cooling purposes. However, the flow mixer 28 also forms an extremely rigid, lightweight, structural member which is capable of resisting the extremely high loads generated thereon by the plug support 40.

The cylindrical support member 40 for the plug 34 is secured to a flange 48 extending from the downstream end of duct 52. A pair of thin-walled rings 50, 46 are respectively provided at the forward and rearward ends of duct 52 to impart radial stiffness to the duct 52. The rings 50, 46 are structurally interconnected by a series of thin-walled ribs 53 which impart longitudinal stiffness to the annular member 45. The ribs 53 have a reduced depth intermediate the discs 50, 46 for light weight. Panels 55 interconnect adjacent alternate pairs of ribs 53 to prevent buckling thereof. The adjacent pairs of ribs 53 are positioned at their forward end to form extensions of the tubular struts 56, as shown in FIGURE 5. A cross rib 57, together with the ribs 53, cooperate to form extensions of the struts 56 and transfer the loads from the ring 50 to the struts 56 in shear. The ribs 53, at their rearward end are positioned as shown in FIGURE 5 to transfer the load from the ring 46 to the struts 58 over a distributed area. The load transfer is further distributed by securing the inward end of the struts 58 to a flange 47 of the ring 46.

The loads are transferred from the struts 56, 58 to the outer portion of the flow mixer in a similar fashion. A pair of outer thin-walled rings 61, 63 are secured to the outer cylindrical duct 54 at the forward and rearward ends respectively.

A series of ribs 60 interconnect the rings 61, 63 to impart longitudinal stiffness to the annular member 46. The ribs 60 are positioned, as shown in FIGURES 5 and 6, to form extensions of the side walls of the struts 56. Cross ribs 75, 71 and a centrally disposed rib 73 cooperate with the ribs 60 to transfer loads from the struts 56 to the ring 61 over a distributed area. Adjacent ribs 60, at their rearward end, slope towards one another as shown in FIGURE 6. The bases of the ribs 60 extend away from one another in a triangular fashion and are secured to extension portions of the tubular struts 58. The ribs 60, a cross rib 79, and a series of gussets 77 cooperate to transfer the load from strut 58 to the ring 63 over a distributed area.

The ribs 60 and an outer shell 88 cooperate to form the plenum chamber 43 for cooling air previously referred to. It should be noted that a series of openings 86 and 90 in the ribs 60 and disc 63 respectively provide a passage for bypass air to a serrated inner shell 91 of the nozzle 36. The air thus discharged through the shell 91 provides cooling for the nozzle 36. Cooling air may also be directed to the plug 34 through the hollow struts 58 and openings 41 in the flange 47.

Extending from the duct 54 and shell 88 are a pair of flanges 62, 64 respectively, which transfer the load to a double walled portion of the engine casing 11 over a distributed area.

The engine casing 11, on which the flow mixer 28 is mounted, has relatively thin walls. This thin-walled cylindrical configuration resists deformation in response to circumferential axial loads but has very little resistance to localized radial loads. The loads transferred from the flow mixer 28 to the casing 11 therefore must be substantially in an axial direction and uniformly applied around its circumference in order to prevent any substantial deformation thereof.

The loads exerted on the flange 48 by the nozzle support 40 are generally in an axial direction. The load exerted on the plug 34 by the flow of the exhaust gases is uniformly applied around the circumference of the flange 48, while the load caused by an aircraft turning movement varies in magnitude around the flange 48 in a sinusoidal fashion. Radial static loads are uniformly exerted around the flange 48.

When an axial load $F_a$ is applied to the flange 48 (FIGURE 3), it generates what is known as a doughnut moment on the annular structural member 45 comprised of the duct 52, ribs 53, and rings 46, 50. This moment acts to turn the member 45 inside out. However, because the rings 46 and 50 are axially separated, a resisting moment is exerted which minimizes the deflection of the member 46 in response to the doughnut moment. Furthermore, the depth of the rings 50, 46 minimizes the hoop stresses therein in exerting this resisting moment.

The same load $F_a$ acts to bend the structure formed by the struts 56, 58, and the panel means 59 about a tangential neutral axis intermediate the struts 56, 58. By axially separating the struts 56, 58, the resisting moment exerted by the structure formed thereby is maximized, thereby minimizing its deflection. The panel means 59 provide an additional resisting moment, while minimizing the deflection of the struts 56, 58 relative to one another.

The outer duct 54, the rings 61, 63, and the ribs 60 cooperate to form the annular structural member 46 to which is applied a reaction load $F_r$ in response to the applied load $F_a$. This load $F_r$ generates a doughnut moment on the member 46 which acts to turn it inside out, but the axially spaced rings 61, 63 enable the structure to exert a resisting moment which minimizes its deflection.

The concentrated reaction loads in the struts 56, 58 are transmitted to the rings 50, 61, and 46, 63 respectively through the ribs 53 and 60. This is done to distribute the load applied to the thin-walled rings and prevent buckling.

The rigidity of the outer flow mixer structure 46 also enables the engine casing 11 to support radial loads, by transferring the loads to the casing 11 in shear around the circumference of the flanges 62, 64. This distribution of the loads minimizes the deflection of the casing 11. Because the flow mixer can effectively support radial loads, it may conveniently be used to support an engine bearing. Such a use is herein illustrated by a conical support member 95 (FIGURE 1) suitably secured to the ring 45 and to a bearing 96 for one of the shafts 26.

By utilizing the flow mixer 28 additionally as a support member, the weight and length of the engine 10 are significantly reduced.

While the present invention has been described in terms of discrete structural elements joined together by suitable means, it is preferable that the flow mixer 28 be formed of a composite structure of castings joined together to form an integral unit. Each juncture of structural elements is included within one of these castings to eliminate all fillet welds in the structure. The castings extend from the joints and are connected to adjacent castings, as by welding, at butt joints $j$ to eliminate stress concentrations experienced with filleted joints.

The invention thus described is not limited to the mixing of concentric streams of fluids, and supporting a nozzle plug in a gas turbine engine but may be used in any situation where a pair of concentric streams flowing in a thin-walled shell are to be mixed and the shell is to support loads exerted radially inward of the concentric streams.

Other modifications of the described embodiment of the present invention will occur to those skilled in the art and the scope thereof is to be derived solely from the following claims.

Having thus described the invention, what is claimed as novel and desired to be secured by Letters Patent of the United States is:

1. A flow mixer for mixing inner and outer concentric fluid streams bounded by an outer generally cylindrical thin-walled casing and separated by an intermediate duct, said flow mixer comprising, inner and outer annular structural members having ducts defining the inner and outer bounds of said fluid stream, said annular structural members further comprising relatively thin rings extending from both ends of said ducts and generally longitudinal stiffeners interconnecting said rings, thereby providing said annular structural members with a maximum rigidity to weight ratio in resisting a doughnut moment applied thereto, a plurality of struts structurally interconnecting said inner and outer annular structural members at the inlet and outlet ends of said flow mixer, generally longitudinal panel means interconnecting said inlet and outlet struts for providing longitudinal stiffening thereof and separate flow passages through said mixer, ramps extending from said intermediate duct to the outer duct through certain passages for discharge of the inner fluid stream from the flow mixer and other ramps extending from said intermediate duct to the inner duct through other passages for discharge of the outer fluid stream from the flow mixer, whereby the fluid streams are discharged across the full width of the flow mixer outlet annulus and said fluid streams are interspersed around the circumference of said outlet annulus, said inner annular member being adapted to receive generally axial loads and said outer annular member being adapted to mount on said cylindrical casing, whereby the deflection of said flow mixer in response to said loads on said inner casing is minimized and the loads are transmitted to said cylindrical casing in substantially an axial direction.

2. A flow mixer as in claim 1 wherein,
said intermediate annular duct terminates intermediate the width of said inlet struts.

3. A flow mixer as in claim 1 wherein,
said inlet and outlet struts are secured to said annular structural members through said rings, thereby further minimizing distortion of said annular structural members.

4. A flow mixer as in claim 3 wherein,
said longitudinal stiffeners comprise ribs,
said inlet and outlet struts are hollow and are secured to said rings through said ribs which are structurally integral with the walls of said struts.

5. A flow mixer as in claim 1 further comprising,
flange means on said inner duct for receiving a generally axial load and distributing said load around the circumference of said ring,
flange means on said outer duct for circumferential mounting with said casing,
whereby distortion of said inner and outer annular members is minimized, and the deflection of said casing in response to radial loads is minimized.

6. A flow mixer as in claim 1 wherein,
said inlet struts have a streamline cross section to minimize the resistance to flow at the inlet of said flow mixer,
said outlet struts have a tubular cross section for inducing turbulence in the fluid streams discharged from said flow mixer and thereby provide effective mixing of said fluid streams.

7. A flow mixer as in claim 1 wherein,
said inlet struts are disposed in a truss-like fashion with adjacent struts meeting alternately at the inner and outer annular structural members and said ramps extend to the outer duct and inner duct in alternate passages, said flow mixer further comprises, fairing means extending between adjacent inlet struts at their inner junction for directing the inner fluid stream into flow paths defined on either side by adjacent fairings, said inlet struts at their outer end form a generally triangular inlet for passageways defined by the outer side of said outwardly directed ramps and said panels, and said outer duct has openings therein for diverting of said outer fluid stream from the passageways therefor.

8. A flow mixer as in claim 5 in combination with a gas turbine engine of the bypass type wherein, said outer casing and said intermediate duct provide a flow path for bypass air and the intermediate duct defines the outer bounds of a flow path for a hot gas stream discharged from the main gas generator of said engine, said flow mixer is secured to said casing immediately adjacent the discharge end of said main gas generator, said gas turbine engine comprises a mixing chamber secured to the outlet of said flow mixer, whereby said flow mixer is an integral structural unit with said casing, thereby minimizing the axial length of said engine.

9. A combination as in claim 8 wherein said gas turbine engine further comprises, a generally cylindrical plug secured to the inner annular member of said flow mixer, said plug cooperating with said mixing chamber to form an exhaust nozzle, whereby the flow mixer transmits the relatively large axial and bending loads exerted thereon by said plug to said casing in substantially an axial direction and the deflection of said casing in response to radial loads on said inner member is minimized.

References Cited
UNITED STATES PATENTS

| | | | |
|---|---|---|---|
| 2,978,865 | 4/1961 | Pierce | 60—262 |
| 3,051,452 | 8/1962 | Nobel | 259—4 |
| 3,100,627 | 8/1963 | Wilde | 259—4 |

CARLTON R. CROYLE, *Primary Examiner.*

D. HART, *Assistant Examiner.*